C. MESSICK.
ANTISLIP STAIR SHEET.
APPLICATION FILED SEPT. 1, 1910.

1,094,859.

Patented Apr. 28, 1914.

WITNESSES:
Robert A Byrne
Lyda S Peer

INVENTOR
C Messick

UNITED STATES PATENT OFFICE.

CHARLES MESSICK, OF HACKENSACK, NEW JERSEY, ASSIGNOR, BY DIRECT AND MESNE ASSIGNMENTS, TO ELECTRICAL CONVEYING MACHINERY COMPANY, A CORPORATION OF NEW YORK.

ANTISLIP STAIR-SHEET.

1,094,859.

Specification of Letters Patent.

Patented Apr. 28, 1914.

Application filed September 1, 1910. Serial No. 580,126.

*To all whom it may concern:*

Be it known that I, CHARLES MESSICK, a citizen of the United States, residing in Hackensack, county of Bergen, State of New Jersey, have invented a new and useful Improvement in Antislip Stair-Sheets, of which the following is a specification.

Objects of the invention are to provide a cheap yet efficient long wearing non-slipping rust proof tread for stairways, platforms, etc.

The invention comprises a hard metal base plate having a prepared surface (such as, for instance; is provided by the thin tin surface coating on a heavy gage tinned iron plate, which is adapted to facilitate the intimate union of the plate with a relatively thick superimposed coating of rust resisting lead or equivalent) and a lead coating on the plate with grains of carborundum or the like wear resisting and anti-slipping element impregnated in the lead on the top of the plate to form a tread surface.

Figure 1:
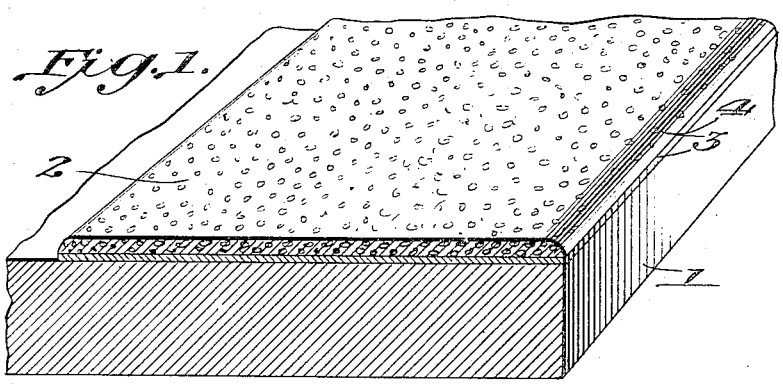
Figure 2:
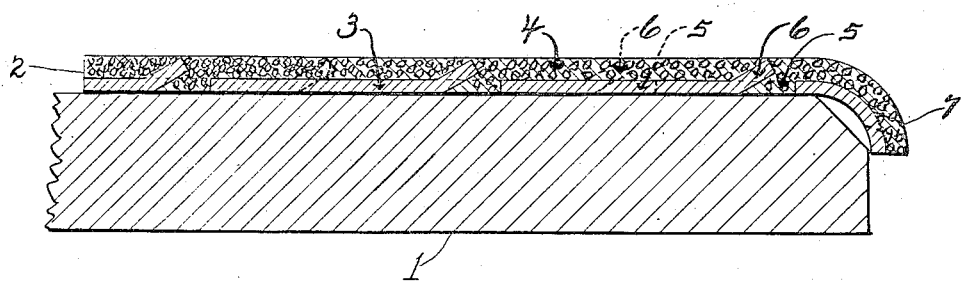

Referring to the accompanying drawing: Figure 1 is a perspective view of the tread. Fig. 2 is a cross section of the tread showing additional details or modifications.

Upon a step 1, is mounted my tread 2, which is composed of several elements. The base of my tread is a heavy tin coated iron plate, 3, upon the surface of which is superimposed a coat of lead. The relatively thick coating of lead 4, is impregnated with particles of carborundum or other grit, in order that it may form a non-slipping surface for foot wear. In Fig. 2 downward extensions of lead 5, interlock with punched up lips 6, formed in the plate to mechanically attach the plate 3, with the lead. At the right of this Fig. 2, 7 indicates a portion of the tread which is bent down to form a nosing for the step.

My tread may be cast by means of a heated mold process somewhat similar to that described in my application, Serial Number 572,651, filed July 18, 1910, for "method for making antislip treads," with obvious adaptations.

Variations of the elements and form may be made in accordance with progress of the art.

I claim:—

1. A friction surface, wear resisting body comprising a tough metal plate whose surface has been prepared to increase its adhesiveness for lead and a coating throughout the wearing surface, of lead, in which friction causing or wear-resisting particles are distributed.

2. A friction surface wear-resisting body comprising a tough metal plate coated throughout its wearing surface with lead in which friction causing or wear-resisting particles are distributed, said coating being secured to said plate throughout their opposing surfaces by an intermediate thin coating intimately adhesive to the surface of the plate and lead coating.

3. A friction surface, wear-resisting body comprising a tough metal plate whose surface has been prepared by tinning to increase its adhesiveness for lead and a coating throughout the wearing surface, of lead, in which friction causing or wear-resisting particles are distributed.

4. A friction surface wear-resisting body comprising a tough metal plate coated throughout its wearing surface with lead in which friction causing or wear-resisting particles are distributed, said coating being secured to said plate throughout their opposing surfaces by an intermediate thin tin coating intimately adhesive to the surface of the plate and lead coating.

5. A friction surface, wear-resisting body comprising a tough metal plate having a surface adapted to render it intimately adhesive to lead and a coating throughout the wearing surface, of lead, in which friction causing or wear-resisting particles are distributed.

6. A friction surface, wear-resisting body comprising a tough metal plate, a thin coating of tin to increase its adhesiveness for lead and a coating throughout the wearing surface, of lead, in which friction causing or wear-resisting particles are distributed.

7. A friction surface, wear-resisting body comprising a tough metal plate having a surface adapted to render it adhesive to lead, a coating of lead, friction causing or wear-resisting abrasive particles distributed and embedded in the lead and intimate metallic adhesion between the plate and the lead throughout the bottom of the wearing surface.

8. A tread consisting of a tough metal base plate having a surface adapted to render it adhesive to lead, a lead coating having friction particles embedded and distributed therein and intimate adhesive metallic attachment throughout the base of the lead and the surface of the plate.

CHARLES MESSICK.

Witnesses:
ROBERT A. BYRNE,
LYDA S. PEER.